(12) United States Patent
Schmidt et al.

(10) Patent No.: US 7,523,414 B2
(45) Date of Patent: Apr. 21, 2009

(54) METHOD FOR NAVIGATING BETWEEN SECTIONS IN A DISPLAY SPACE

(75) Inventors: Gunter Schmidt, Unterhaching (DE); Michael Alvers, Munich (DE)

(73) Assignee: Definiens AG, Munich (DE)

( * ) Notice: Subject to any disclaimer, the term of this patent is extended or adjusted under 35 U.S.C. 154(b) by 655 days.

(21) Appl. No.: 10/240,961

(22) PCT Filed: Apr. 2, 2001

(86) PCT No.: PCT/EP01/03732

§ 371 (c)(1),
(2), (4) Date: Feb. 20, 2003

(87) PCT Pub. No.: WO01/75574

PCT Pub. Date: Oct. 11, 2001

(65) Prior Publication Data

US 2004/0095373 A1    May 20, 2004

(30) Foreign Application Priority Data

Apr. 4, 2000   (DE) ................................ 100 16 753

(51) Int. Cl.
*G06F 3/00* (2006.01)
*G06F 9/00* (2006.01)
*G06F 17/00* (2006.01)
(52) U.S. Cl. ...................... 715/798; 715/763; 715/764; 715/765; 715/790; 715/762

(58) Field of Classification Search ................. 715/762, 715/763, 764, 765, 778, 779, 788, 790, 795, 715/796, 797, 798
See application file for complete search history.

(56) References Cited

U.S. PATENT DOCUMENTS

| | | | | |
|---|---|---|---|---|
| 5,227,771 | A * | 7/1993 | Kerr et al. | 715/800 |
| 5,933,143 | A * | 8/1999 | Kobayashi | 715/805 |
| 5,977,973 | A * | 11/1999 | Sobeski et al. | 715/798 |
| 6,169,568 | B1 * | 1/2001 | Shigetomi | 725/76 |
| 6,282,490 | B1 * | 8/2001 | Nimura et al. | 340/995.14 |
| 6,396,520 | B1 * | 5/2002 | Ording | 715/798 |
| 6,957,395 | B1 * | 10/2005 | Jobs et al. | 715/765 |
| 2002/0188436 | A1 * | 12/2002 | Schmidt et al. | 704/1 |
| 2005/0071773 | A1 * | 3/2005 | Ivanovic et al. | 715/768 |

* cited by examiner

*Primary Examiner*—Tadesse Hailu
*Assistant Examiner*—Anita D Chaudhuri
(74) *Attorney, Agent, or Firm*—Imperium Patent Works; Darien K. Wallace

(57) ABSTRACT

A computer-implemented method for navigating between sections in a display space is furnished. The sections in the display space are each assigned to a particular location of the display space, and representatives are provided which are each assigned to a particular section in the display space using an unambiguous relation. The method for navigating includes the following steps: selecting at least one representative that is assigned to a particular section in the display space with the aid of the unambiguous relation; and navigating to the particular section in the display space with the aid of the unambiguous relation with the particular section in the display space.

24 Claims, 19 Drawing Sheets

METHOD FOR NAVIGATING BETWEEN SECTIONS IN A DISPLAY SPACE

This application is filed under 35 U.S.C. §111(a) and is based on and hereby claims priority under 35 U.S.C. §120 and §365(c) from International Application No. PCT/EP01/03732, filed Apr. 2, 2001, and published as WO 2001/75574 A2 on Oct. 11, 2001, which in turn claims priority from German Application No. 100 16 753.5, filed on Apr. 4, 2000. This application is a continuation of International Application No. PCT/EP01/03732, which is a continuation of German Application No. 100 16 753.5. This application claims the benefit under 35 U.S.C. §119 from German Application No. 100 16 753.5, filed on Apr. 4, 2000, in Germany. The disclosure of each of the foregoing documents is incorporated herein by reference.

The present invention relates to a computer-implemented method for navigating between sections or windows in a display space.

FIG. 17 shows a method for displaying objects such as, e.g., windows on a work surface. A like method is, for example, used in the operating system Windows by the company Microsoft in order to be able to simultaneously display several windows on the work surface. As is shown in FIG. 17, first to fifth windows 101 to 105 which are overlapping are displayed on a work surface 106. Such overlapping of the first to fifth windows 101 to 105 may, however, cause a user to become confused, which may particularly be the case if many windows are displayed on the work surface, possibly in a highly overlapping condition. In order to solve this problem, there exists in this method a possibility of iconizing or reducing the windows, or placing them in the background. This does, however, have only low functionality.

In order to solve the problems in the above described method, some desktop environments such as those, e.g., of the companies HP, Xerox and SGI, or the desktop environments KDE and GNOME include possibilities of making several desktops or desks available to a computer user.

Such a method is shown in FIGS. 18 and 19. As is shown in FIG. 18, a first view on a work surface 106 comprises first and second windows 101 and 102, respectively, and in accordance with the representation in FIG. 19, a second view comprises third to fifth windows 103 to 105 on the work surface 106. In addition, first and second representatives 107 and 108 are provided on the work surface 106 which serve for being able to carry out navigation from the first view to the second view, and vice versa. These first and second representatives 107 and 108, respectively, may be provided with the aid of virtual and/or actually existing operating elements.

The advantage of such a method resides in the fact that through executing an action with the aid of suitable input means, such as e.g. a computer mouse, it is possible to change between different views established in advance. Hereby working under less cluttered conditions is made possible inasmuch as a smaller number of windows per view are displayed. For instance in the first view shown in FIG. 18, the first and second windows 101 and 102 might relate to text processing, and in the second view shown in FIG. 19, the third to fifth windows 103 to 105 might relate to image processing. In this case, the first representative 107 might have the name "text", and the second representative might have the name "images". In other words, respective views may order respective windows in accordance with topics. In many systems there exists a possibility of changing the names of the representatives in a user-defined way. Moreover the graphic design of the representative may reflect the optionally different graphic properties, such as e.g. shape, color etc., of a respective view, and/or represent the contents of the respective view in the manner of icons, as is the case in the system of the company Xerox.

It is a further advantage of this method that many windows are not confusingly represented in a single view, possibly even in a highly overlapping condition, which have to optionally be iconized and reduced or placed in the background to enable recognition by a user. Rather, each view includes a smaller number of windows.

It is one essential drawback of the above described method that an abrupt transition takes place upon changing from one view to another view. Such an abrupt transition is, however, not in harmony with the user's thought processes, for abrupt transitions do not exist in non-virtual life.

It accordingly is the object of the present invention to furnish a method for navigating between sections or windows in a display space, which allows for a continuous transition between views.

To be more precise, in accordance with the invention a computer-implemented method for navigating between sections in a display space is furnished, with the sections in the display space each being assigned to a particular location of the display space, and representatives being provided which are each assigned to a particular section in the display space with the aid of an unambiguous relation, the method comprising the following steps: selecting at least one representative which is assigned to a particular section in the display space with the aid of the unambiguous relation; and navigating to the particular section in the display space with the aid of the unambiguous relation with the particular section in the display space.

By utilizing the unambiguous relation of a representative with a particular section in the display space and the assignment of the section to a respective particular location of the display space, one obtains the advantage that navigation between sections in the display space may be carried out in a continuous manner.

Fade-in/fade-out change from one section to another section may, for example, be triggered by actuation of a representative such as by clicking on it, after which camerawork such as reducing, enlarging and/or shifting takes place in a suitable manner. The camerawork may, for example, retreat from one section until this section and another section constituting the navigation target are displayed. Subsequently the section constituting the navigation target is approached.

In accordance with one variant of the present invention, navigating is performed as a continuous fade-out/fade-in change from one section to another section.

In accordance with one variant of the present invention, the representatives have names.

In accordance with another variant of the present invention, the representatives may be associated with images.

In accordance with another variant of the present invention, the representatives are elements of an $n^{th}$-order fractal-hierarchical network.

In accordance with another variant of the present invention, objects represented in the sections are stored.

In accordance with another variant of the present invention, the objects represented in the sections are elements of an $n^{th}$-order fractal-hierarchical network.

In accordance with another variant of the present invention, the representatives differ in shape, color and/or texture and reflect the contents of the respective sections assigned to them.

In accordance with another variant of the present invention, navigating is triggered by a user interaction and/or automatically, with automatic triggering being derivable from calculated quantities.

In accordance with another variant of the present invention, the display space is of infinite size.

In accordance with another variant of the present invention, the display space has any desired dimension.

In accordance with another variant of the present invention, the display space is closed.

In accordance with another variant of the present invention, the display space is an ellipsoid or a sphere.

In accordance with another variant of the present invention, navigating is triggered through an inquiry on a network.

In accordance with another variant of the present invention, the display space includes any desired image.

In accordance with another variant of the present invention, navigating is performed with the aid of camerawork on any desired trajectory from one section to another section.

In accordance with another variant of the present invention, a direction of a camera is freely selectable at any point of the trajectory.

In accordance with another variant of the present invention, a period of dwelling at any point of the trajectory is freely selectable.

In accordance with another variant of the present invention, the dwelling period is calculated from data.

In accordance with another variant of the present invention, the representatives are virtual and/or real operating elements.

In accordance with another variant of the present invention, one section or several sections in the display space are marked, and another section or other sections in the display space are displaced by an action to the marked section(s) in the display space.

In accordance with another variant of the present invention, the marked section(s) is/are screen-filling.

In accordance with another variant of the present invention, a history of navigating is used which allows for backward and forward navigation.

In accordance with another variant of the present invention, navigating is triggered through an inquiry on the World-Wide-Web.

In accordance with another variant of the present invention, a meaningful feedback between a representative and the section assigned thereto in the display space is provided.

The present invention shall hereinbelow be explained more closely by way of an embodiment while making reference to the annexed drawing, wherein.

Figure 1:
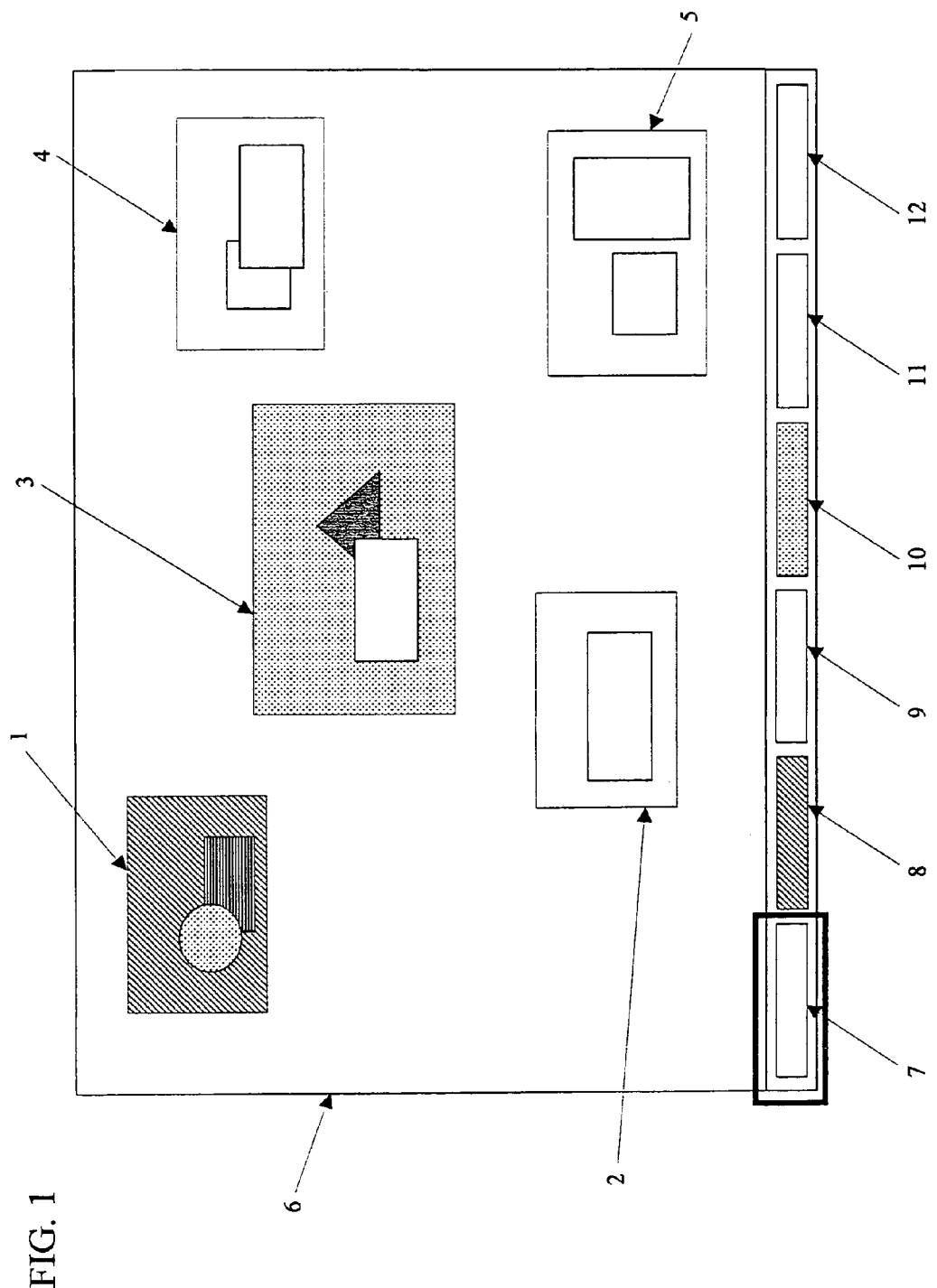
FIGS. 1 to 16 are graphic representations of exemplary method steps in a method according to an embodiment of the present invention.

In the following, a description is given of the embodiment of the present invention.

FIGS. 1 to 16 show graphic representations of exemplary method steps in a method according to the embodiment of the present invention.

In FIGS. 1 to 16, reference numerals 1 to 5 designate first to fifth views, reference numeral 6 designates a work surface, and reference numerals 7 to 12 designate first to sixth representatives.

The work surface 6 serves for displaying respective sections in a display space which contain one or several views. The display space preferably has an infinite size and includes particular views in respective particular locations. Representatives 7 to 12 are virtual and/or actually existing operating elements and may have names and/or be associated with images. What is essential is that with the aid of an unambiguous relation with a particular section in the display space, there is assigned to each representative 7 to 12 this particular section, i.e., a particular one or several particular ones of views 1 to 5, and each section in the display space is assigned to a particular location in the display space. Accordingly, within the display space there exists a locational relation of each section. Thanks to this locational relation, continuous navigation may be performed within the display space with the aid of representatives 7 to 12, as is described in the following by way of examples.

The first representative 7 is intended for representing a section in the display space, with all of the first to fifth views 1 to 5 being displayed on the work surface 6. The second to sixth representatives, in contrast, are intended for singly displaying the respective first to fifth views 1 to 5 on the work surface 6.

As is shown in FIG. 1, a case is being assumed in which the first representative 7 is selected, as is indicated by the frame around the first representative 7, at the outset of a navigation. I.e., all of the first to fifth views 1 to 5 are displayed on the work surface 6.

It should be noted that the contents of the first to fifth views are displayed as any desired geometrical shapes so as to indicate that most variegated objects, such as windows, for example, may be contained in the views. For using the representatives it is largely irrelevant what objects or contents are contained in the views.

Figure 2:
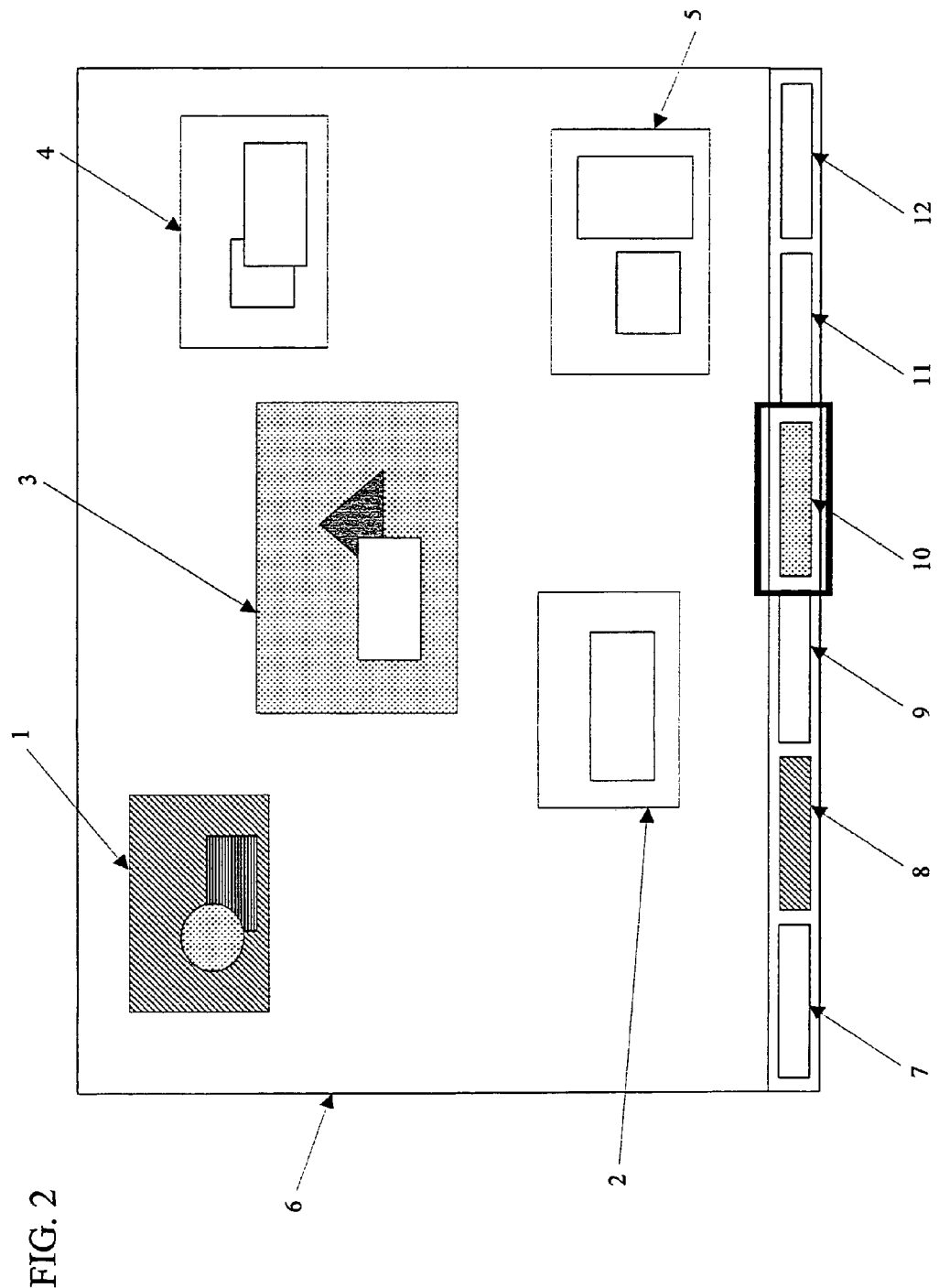
Figure 3:
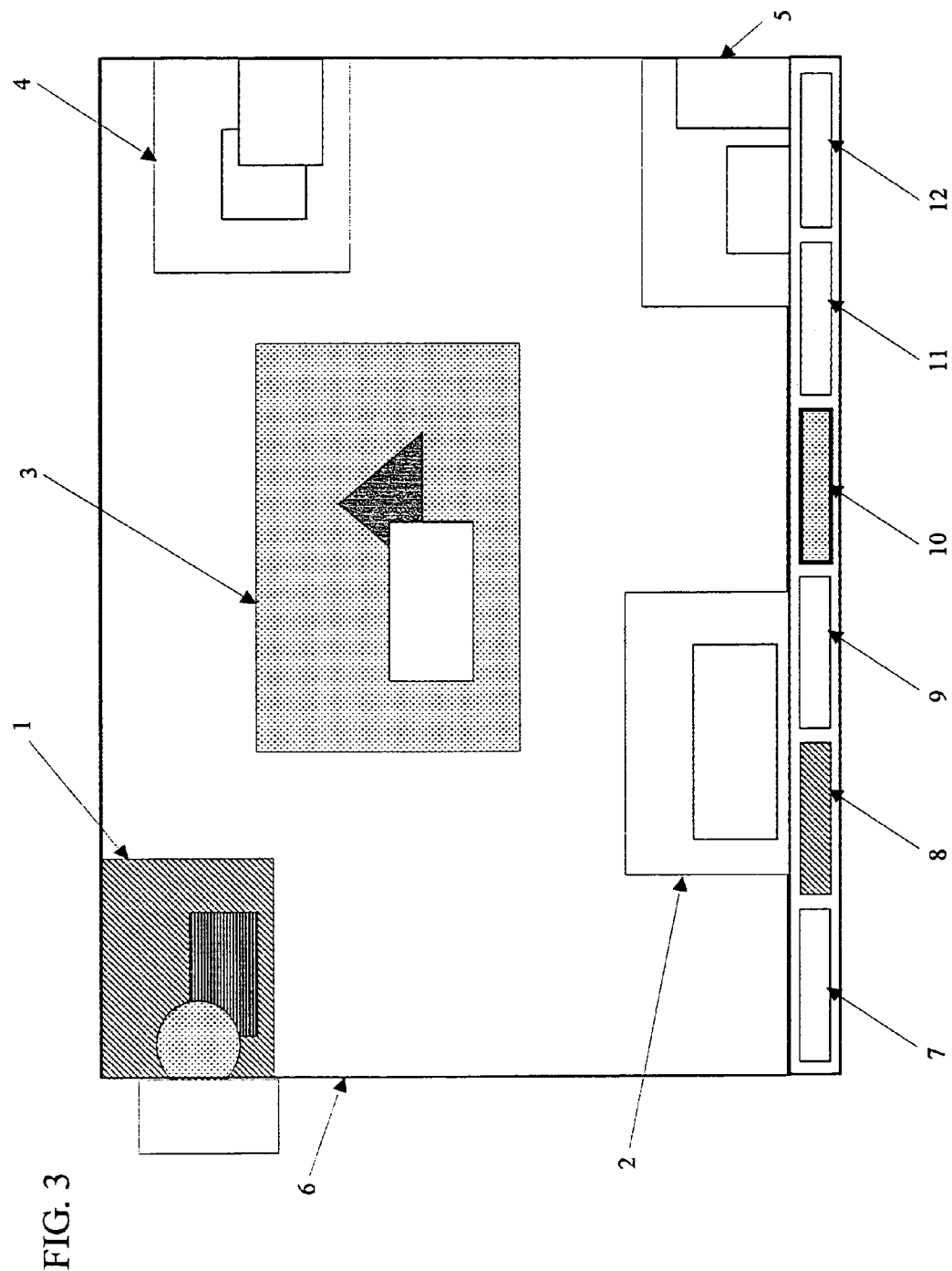
Figure 4:
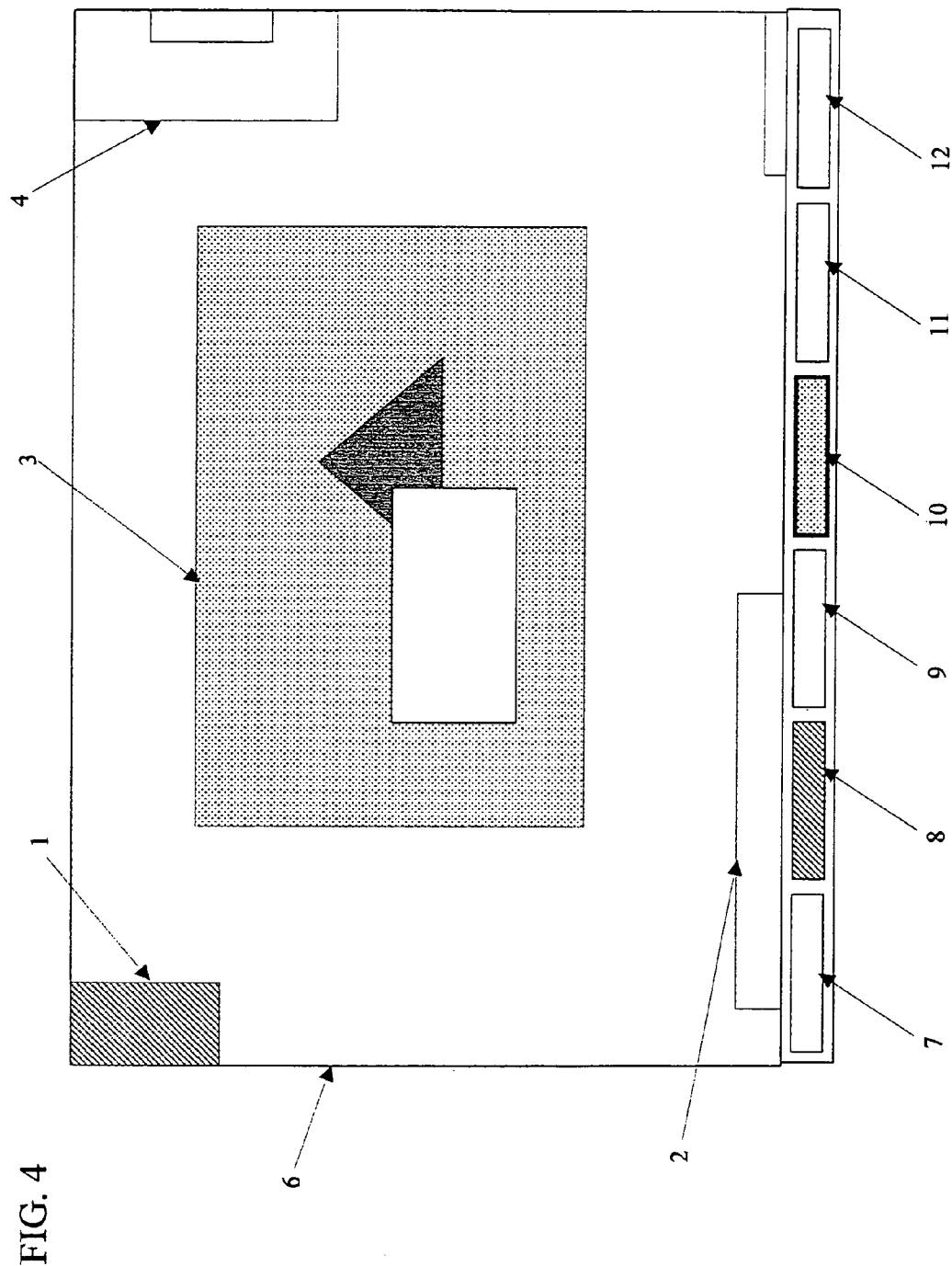
Figure 5:
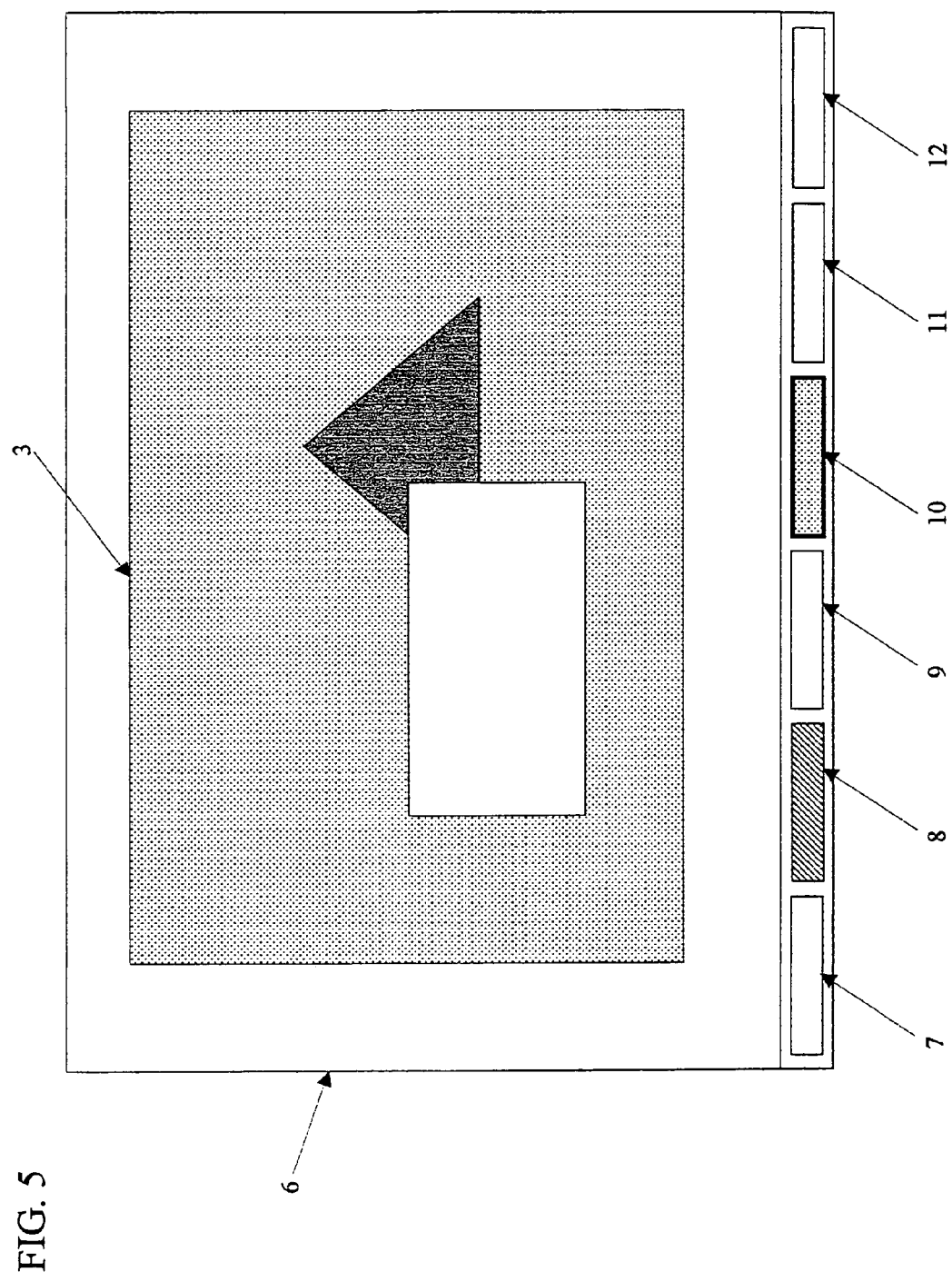

If now, as is indicated in FIG. 2 by the frame around the fourth representative 10, navigation is to be performed from a representation of all of the first to fifth views 1 to 5 to the sole display of the third view 3, the fourth representative 10 is actuated, for example, with the aid of suitable input means. This may be carried out, for example, by clicking on the fourth representative 10 with a computer mouse if representatives 7 to 12 are virtual operating elements on the work surface 6.

Figure 6:
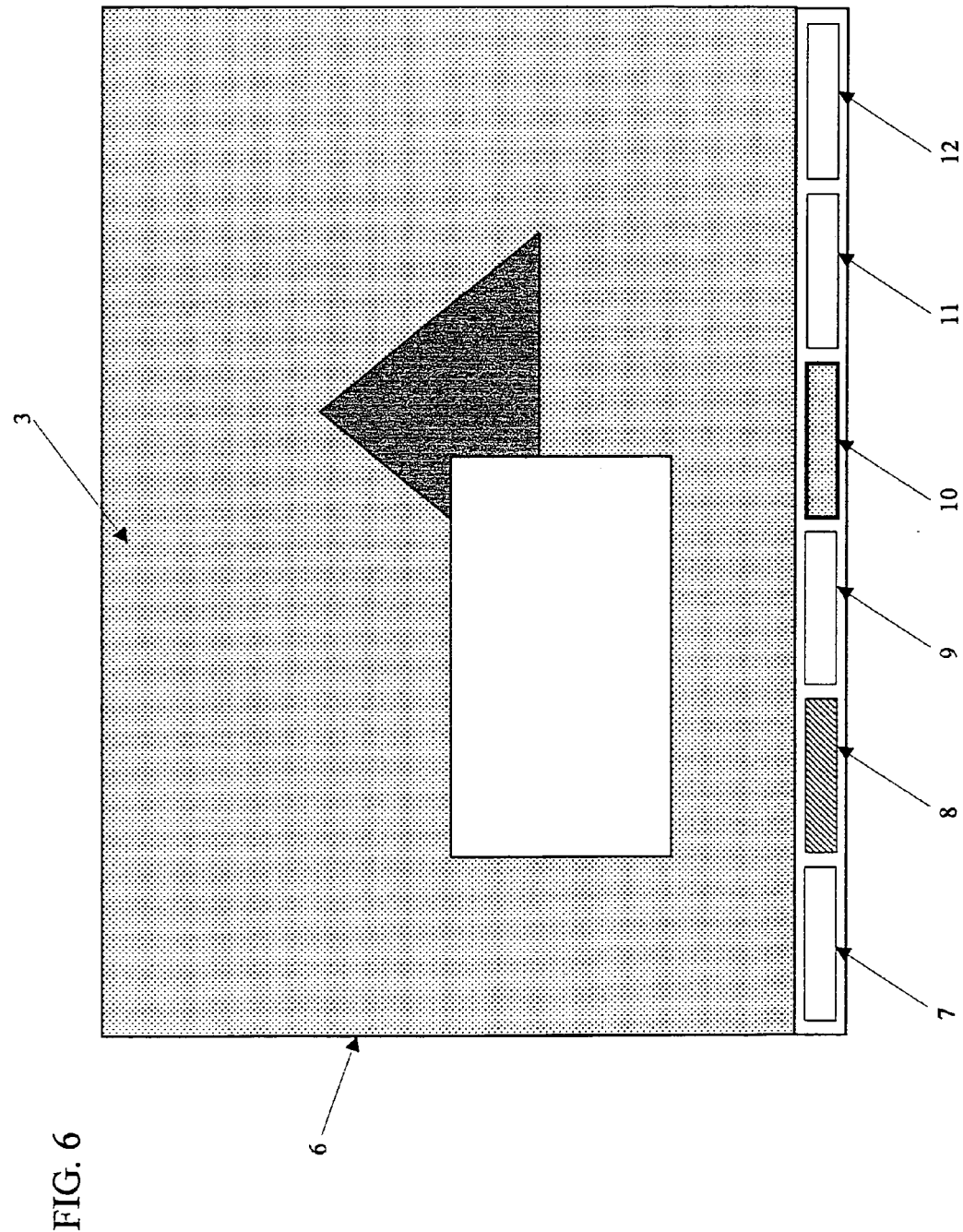
Figure 7:
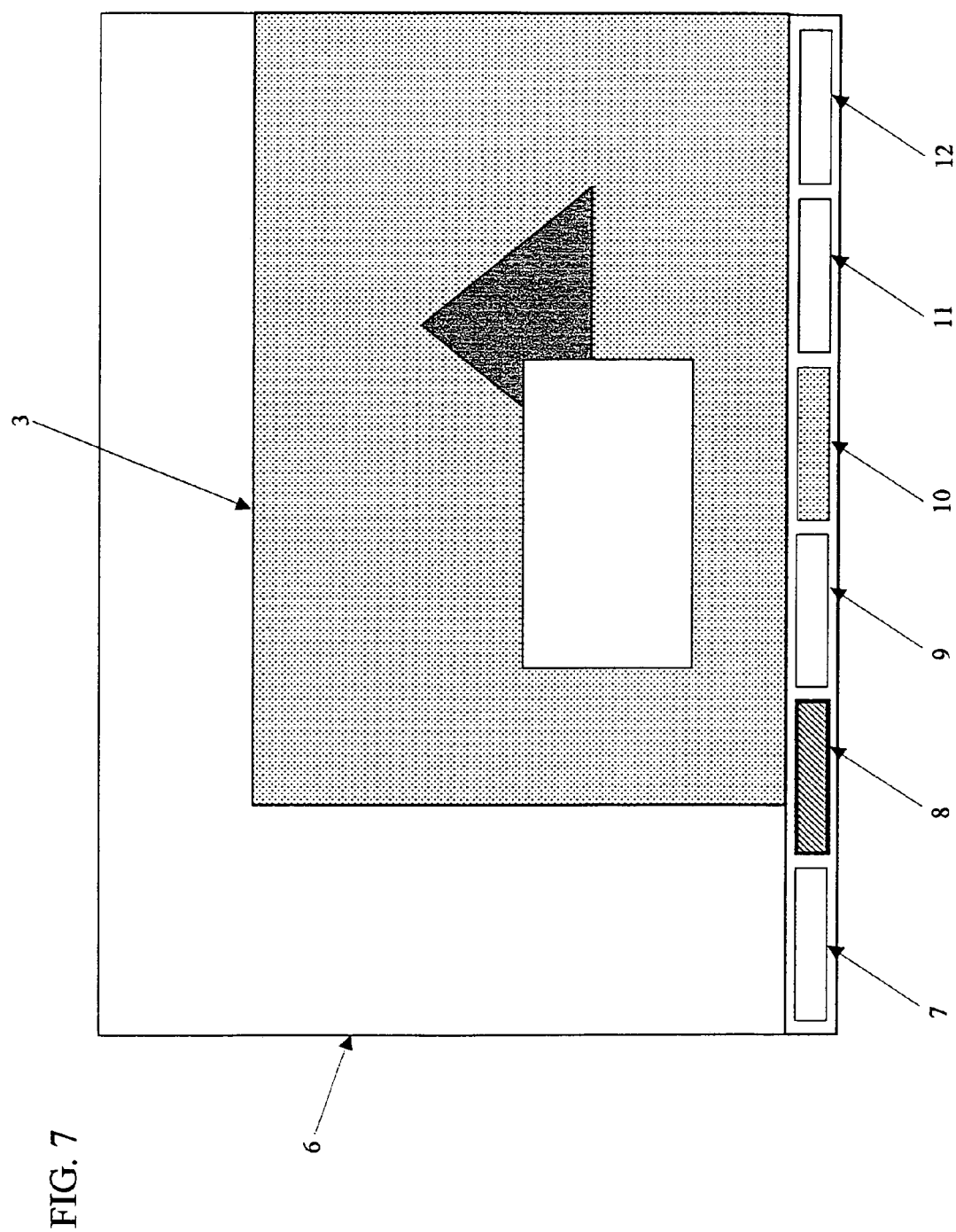
Figure 8:
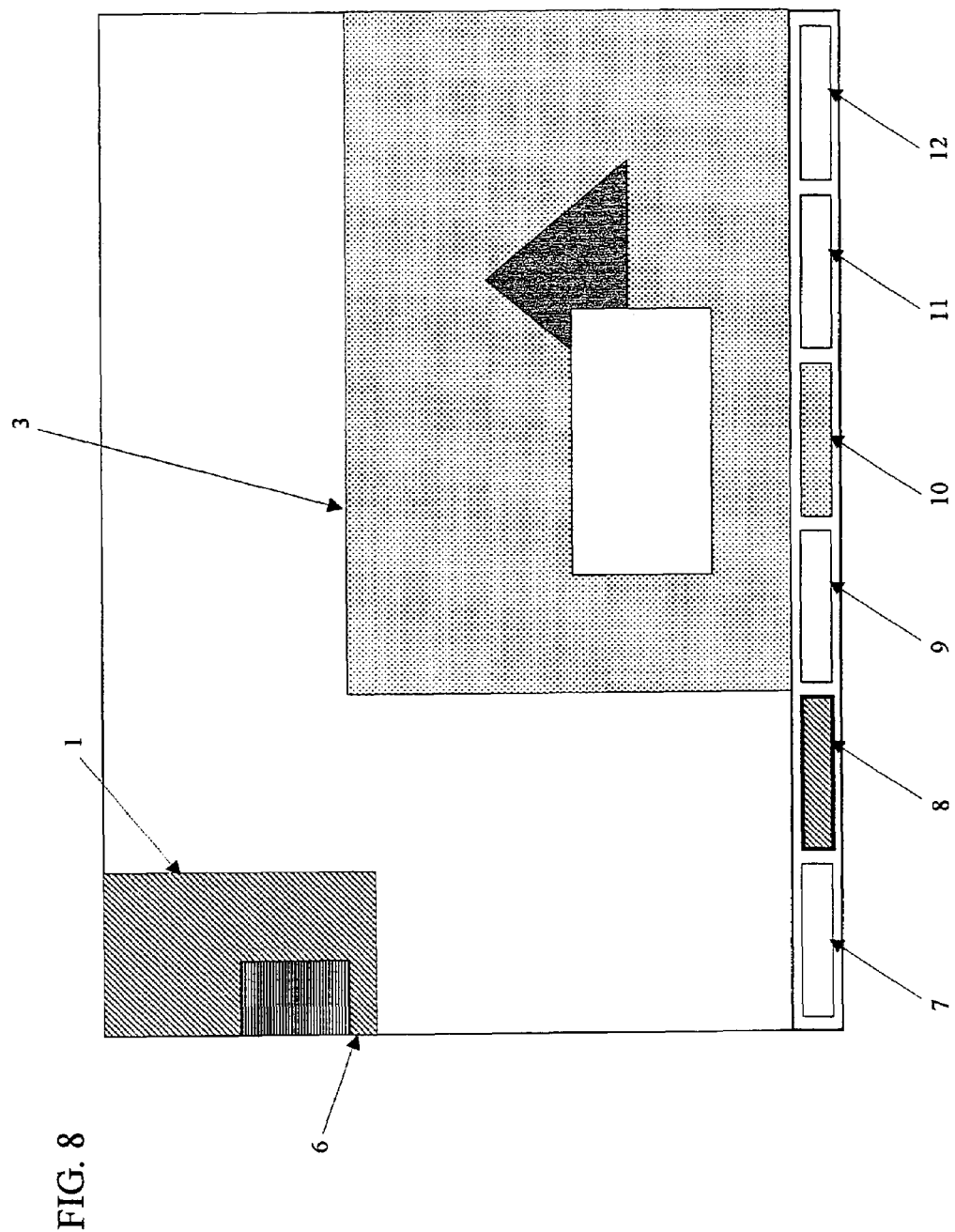
Figure 9:
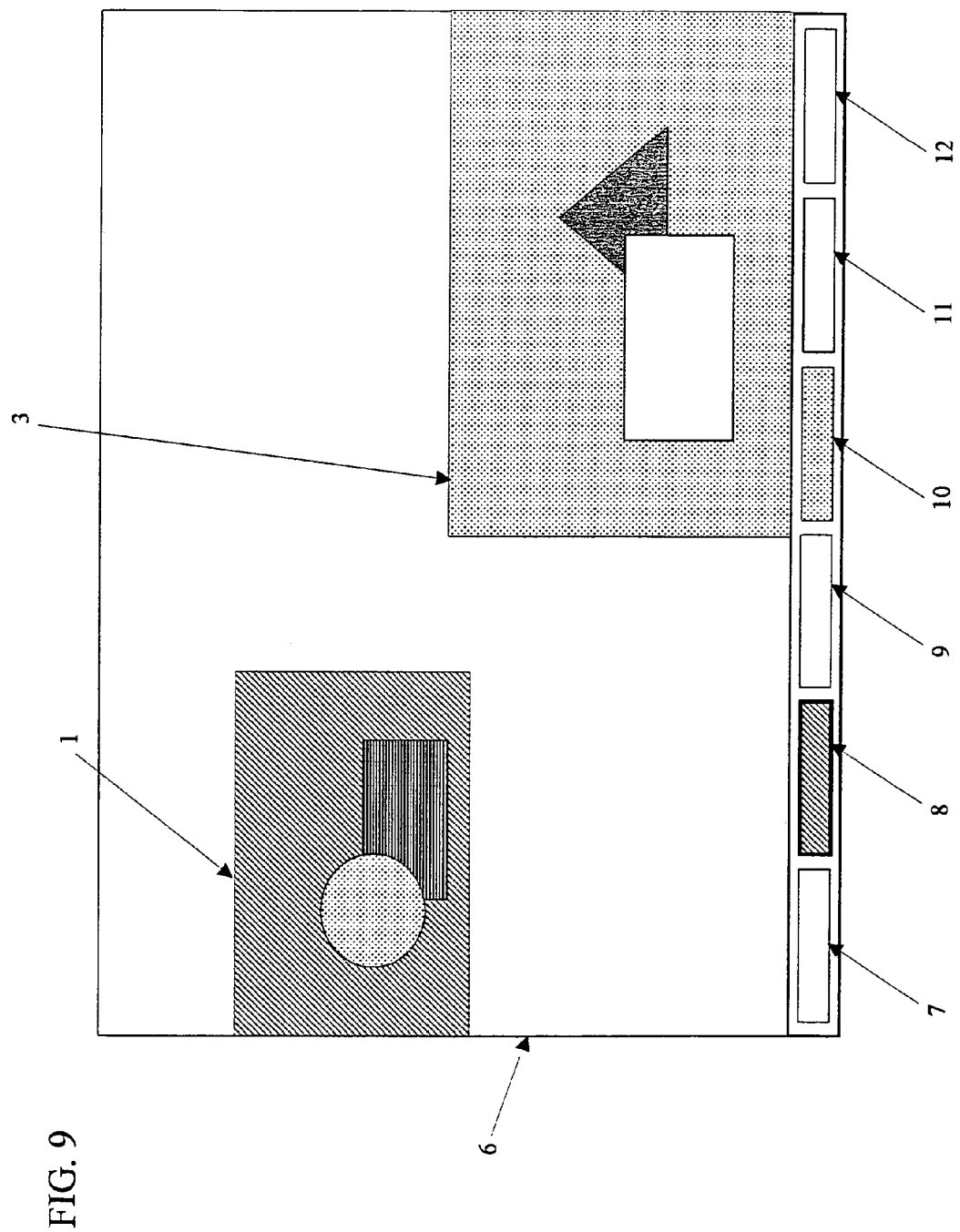
Figure 10:
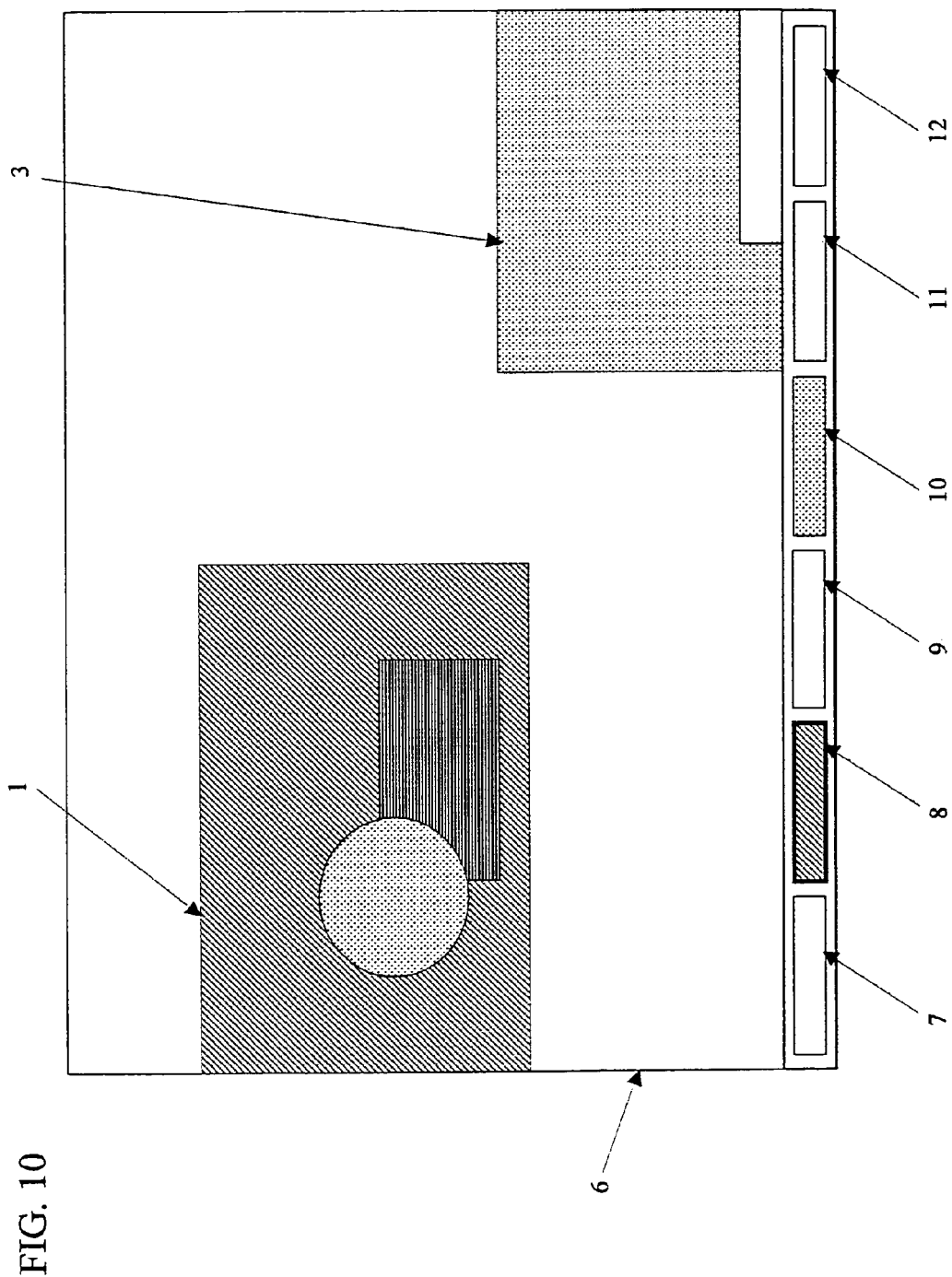
Figure 11:
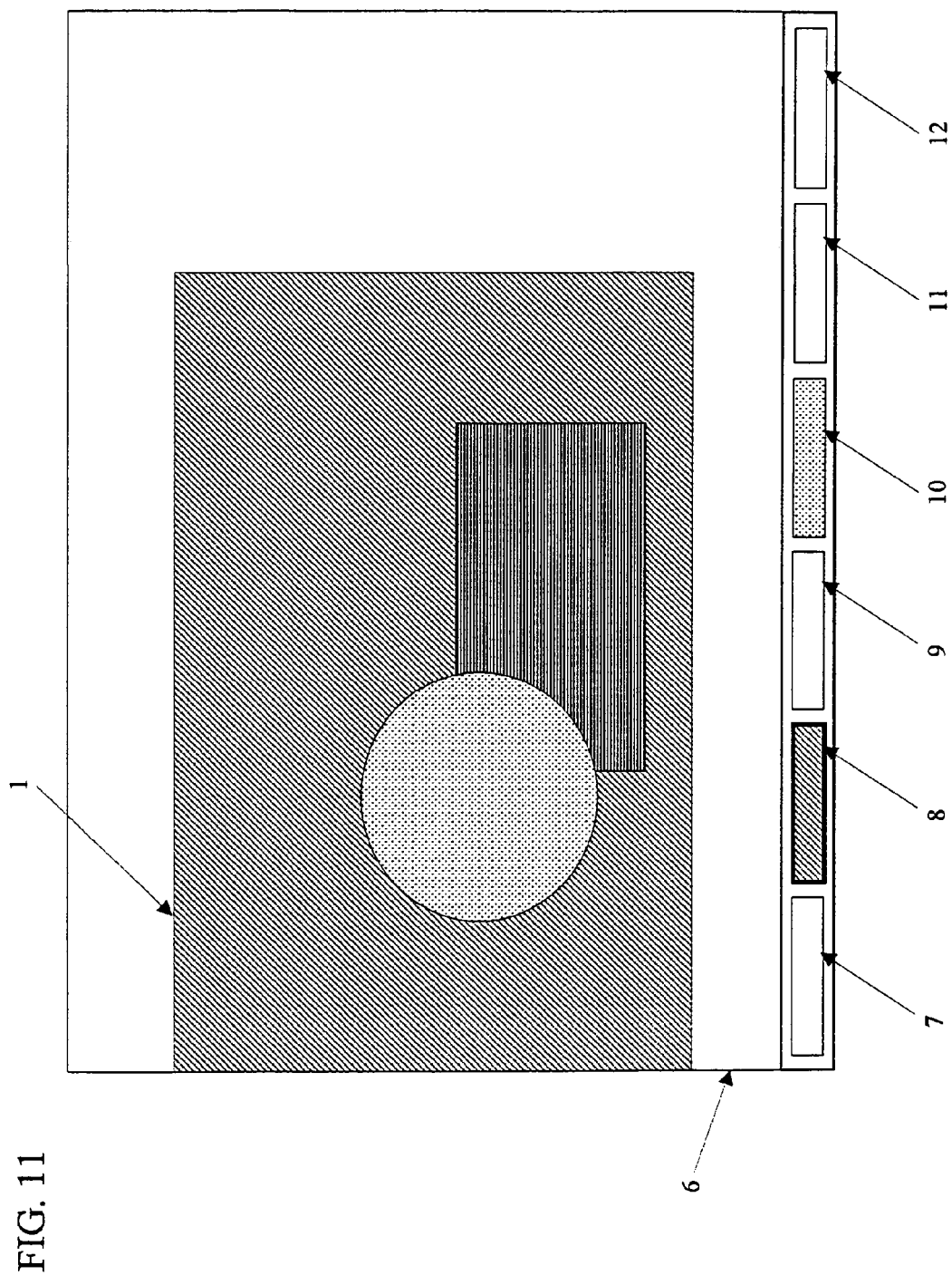
Figure 12:
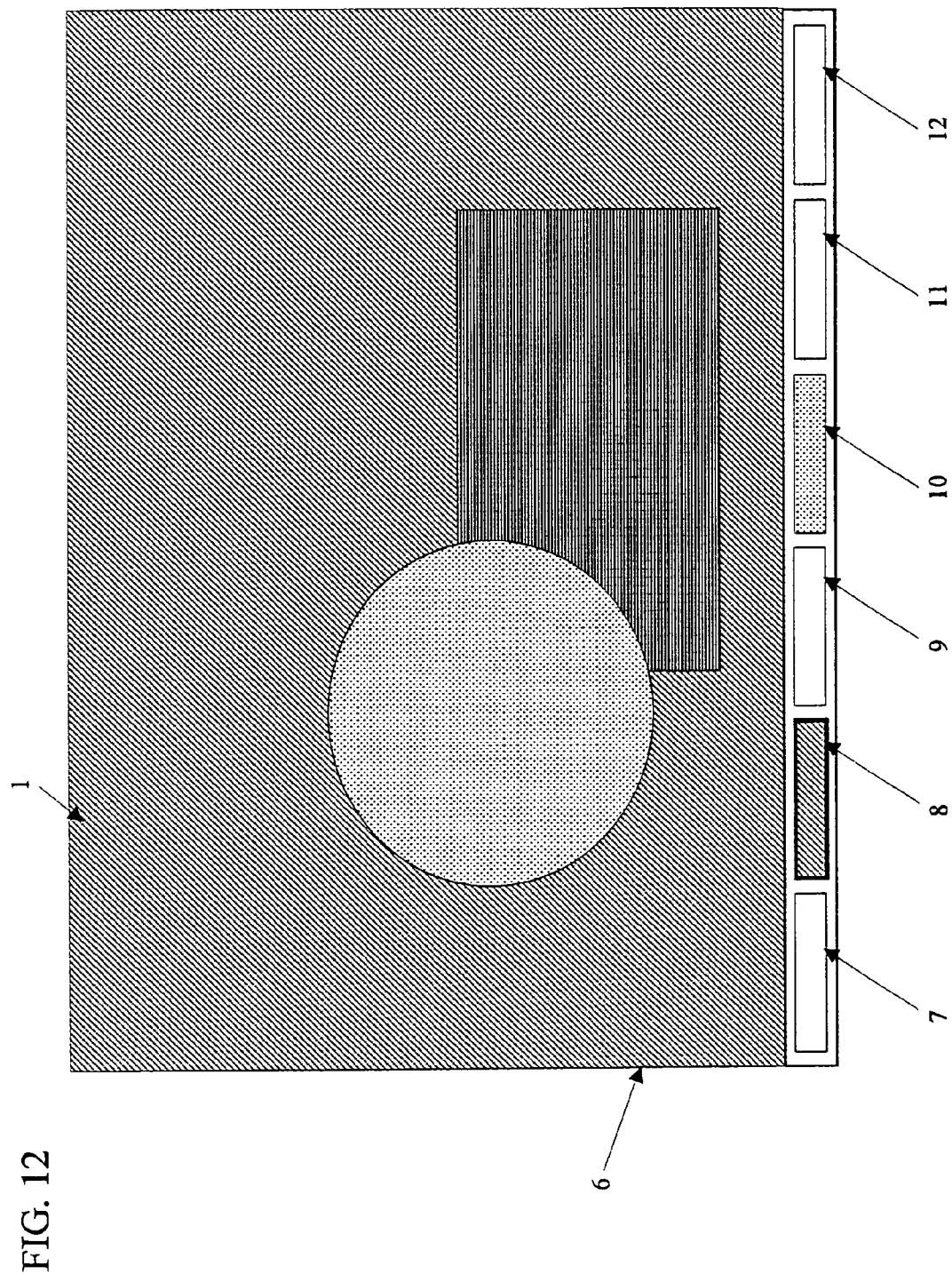

As is shown in FIGS. 3 to 6, what now takes place is camerawork to the effect of the third view 3 by and by increasing in size and the first, second, fourth and fifth views 1, 2, 4 and 5, respectively, by and by becoming smaller and slowly fading out of the work surface until ultimately the third view 3 fills the entire work surface. This navigation step thus is terminated when the state shown in FIG. 6 is reached. This navigation is made possible by the unambiguous relation the representatives 7 to 12 have with respective sections in the display space.

In a next navigation step, navigation from the third view 3 to the first view 1 is to be carried out. This is initiated by actuating the second representative 8 having the unambiguous relation with that section in the display space in which the first view 1 is present.

As is shown in FIGS. 7 to 12, camerawork in this navigation step takes place such that the third view 3 is reduced in size until the first view 1 and the third view 3 both are visible in the work surface 6. Subsequently the first view 1 is increased in size, and the third view 3 fades out from the work surface 6. This is again performed until the first view 1 is displayed on the entire work surface 6, and this navigation step thus is completed.

The above described camerawork only constitutes one camerawork option. For example, when changing from one view to another view, it is possible not to reduce until the view from which navigation starts out and the view constituting the navigation target are displayed on the work surface 6, but to reduce until all of the views present in the display space are displayed on the work surface 6. Such camerawork has the advantage that after a short accommodation period, a user will acquire a feel for where the respective views are located in an overall context.

What may moreover be provided is a coloring and/or patterning of a background in accordance with a represented view and/or a graphic design of the representatives which optionally reflect various graphic properties such as shape and color of the respective view and/or reproduce the contents of the respective view in the manner of an icon.

Figure 13:
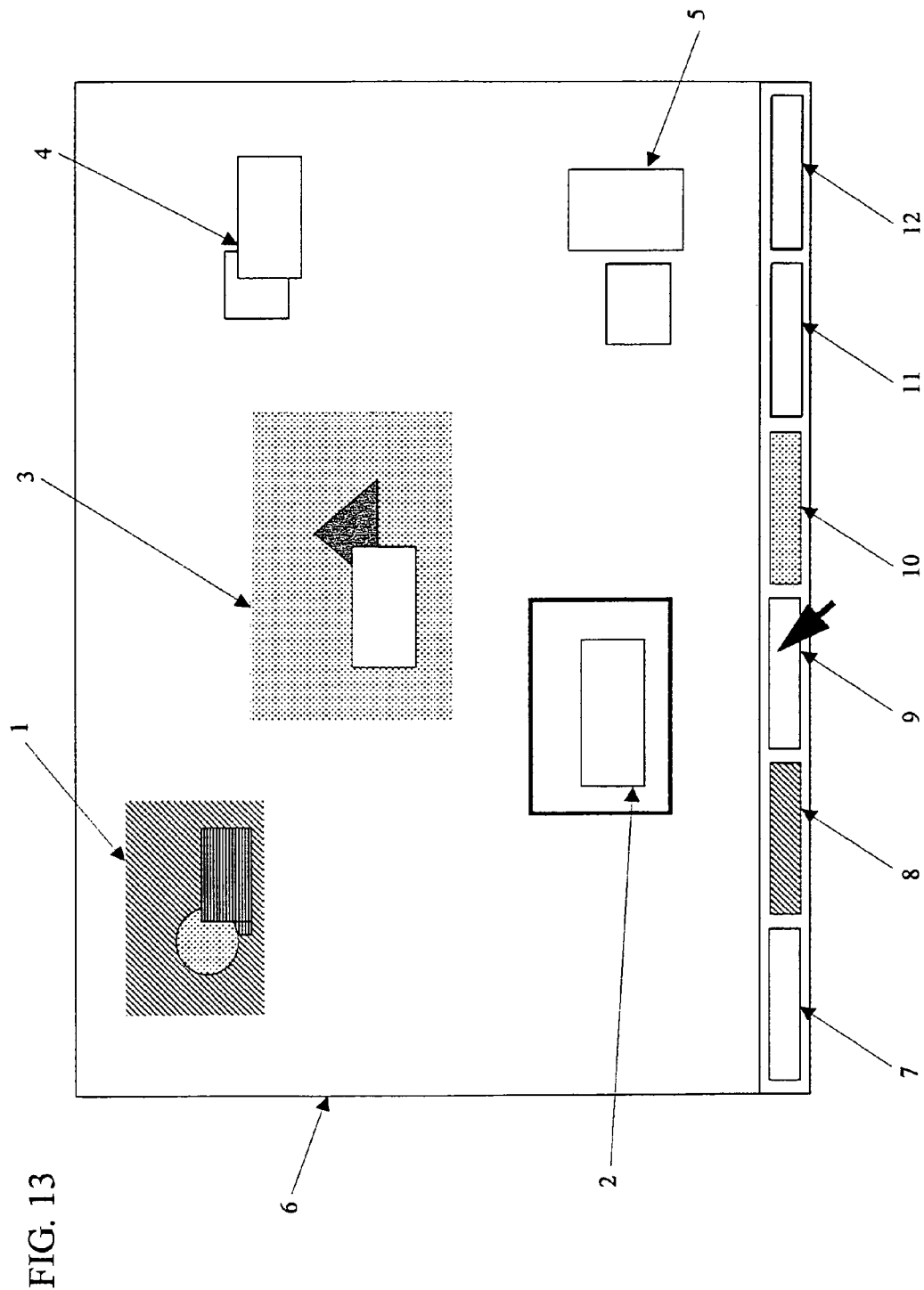
Figure 15:
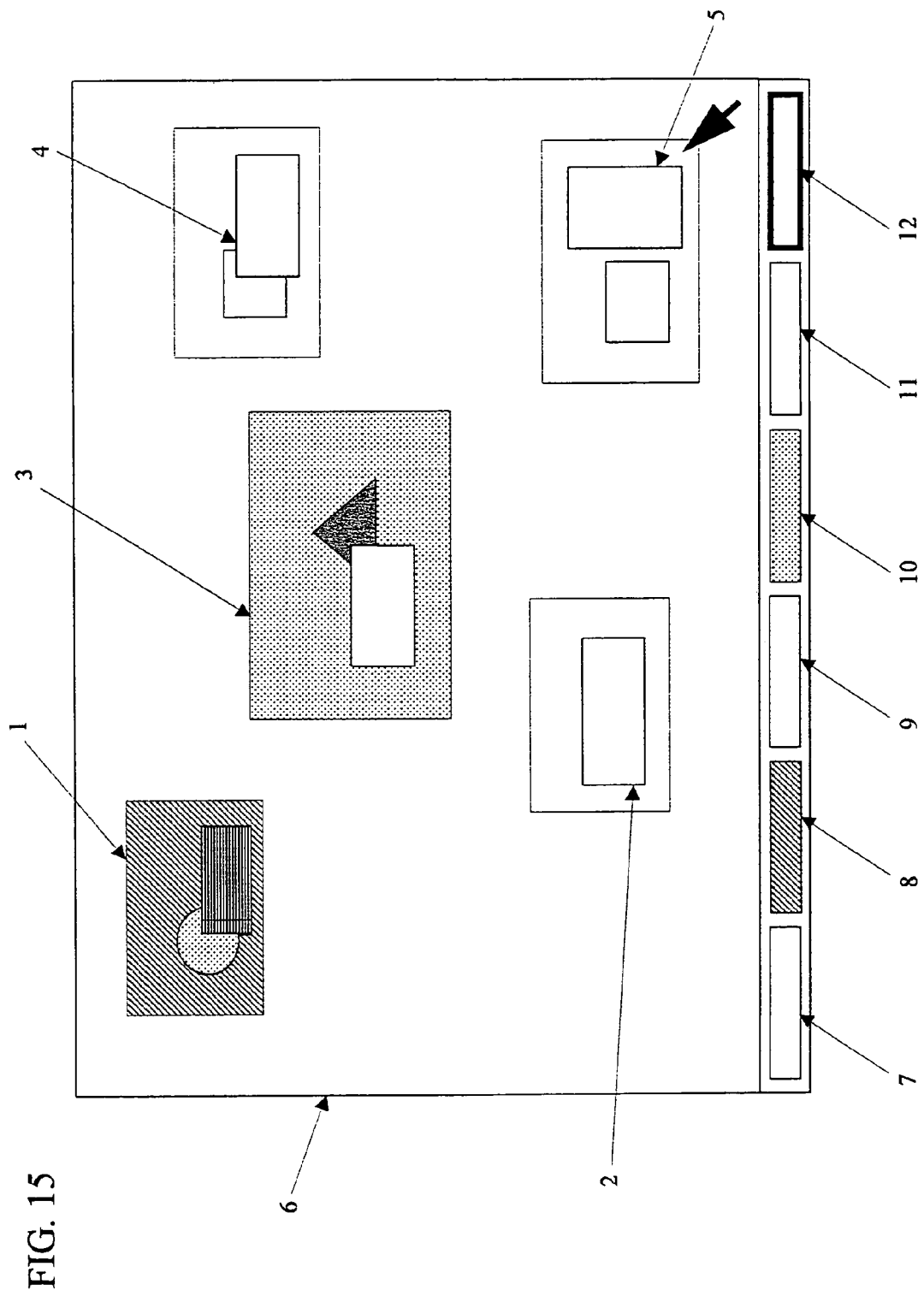

As is shown in FIGS. 13 and 15, there moreover is the possibility of providing a semantic or meaningful feedback, for example upon touch on a representative or a view.

Figure 14:
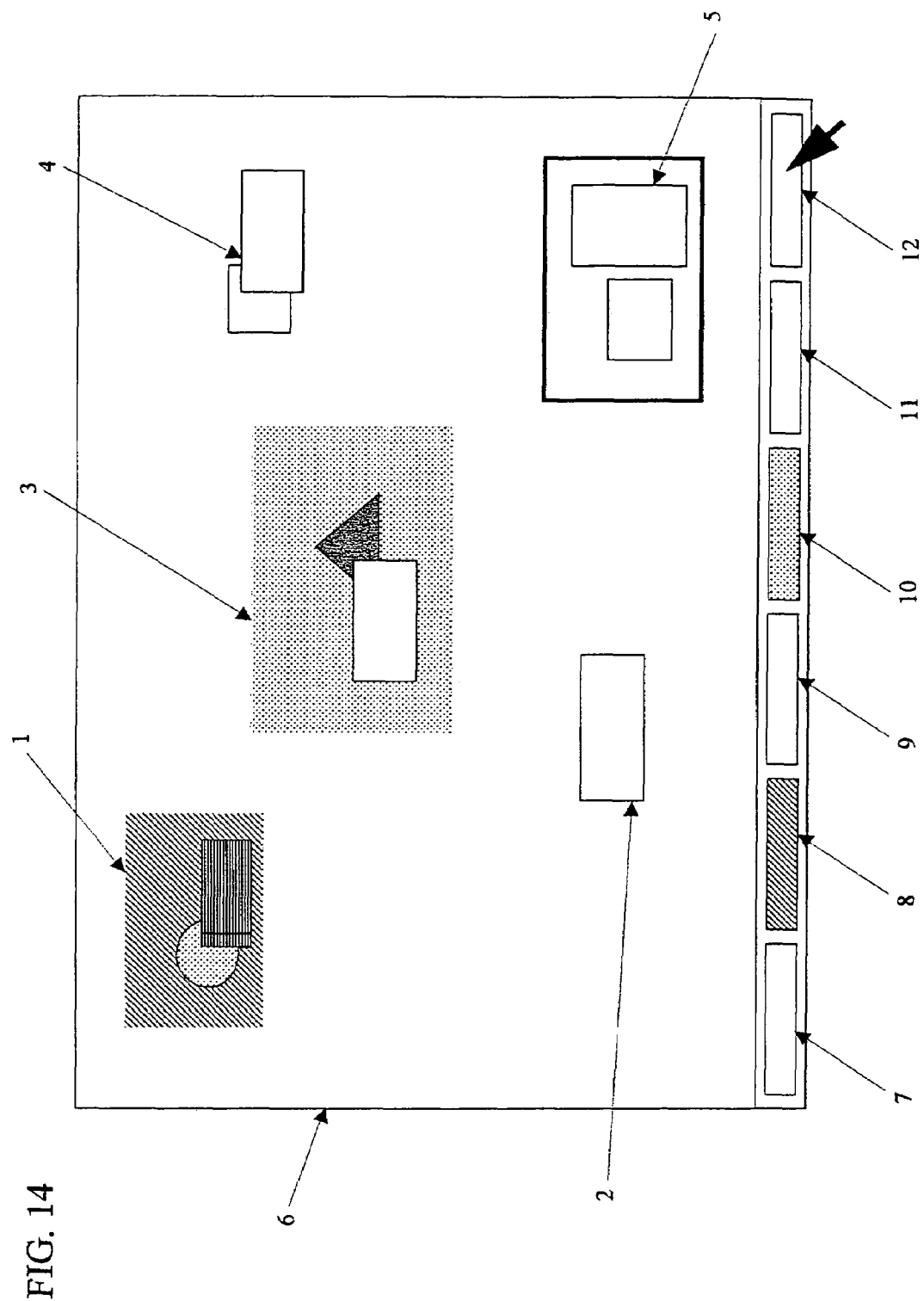

For example, as is shown in FIGS. 13 and 14, where suitable input means touch a representative, the view associated with this representative may be emphasized. In FIG. 13, the second view 2 is provided with a frame because the third representative 9 associated with the second view 2 is touched, as is indicated by the arrow in FIG. 13. In FIG. 14, the fifth view 5 is provided with a frame because the sixth representative 12 associated with the fifth view 5 is touched, as is indicated by the arrow in FIG. 14.

As is shown in FIG. 15, there moreover is the possibility of touching a region in the work surface having a representative, upon which the representative associated with this region is emphasized. In FIG. 15, for example, an arrow touches the fifth view 5, and accordingly the sixth representative 12 is emphasized, as is indicated by the thick frame about the sixth representative 12. If, now, the region is selected such as by a mouse click, it is possible to enlarge to this region, as was described above by referring to FIGS. 1 to 12.

Figure 16:
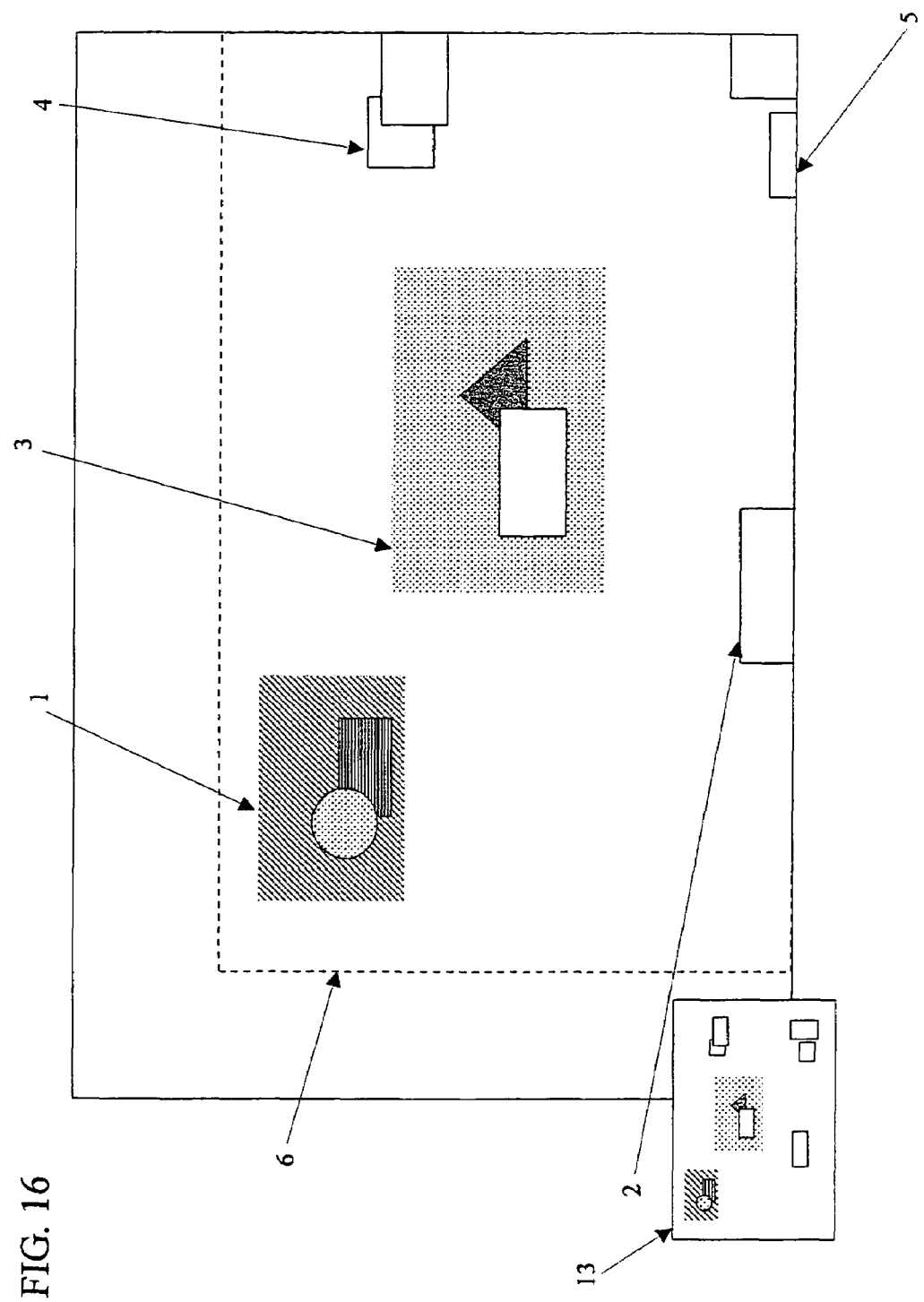
Figure 17:
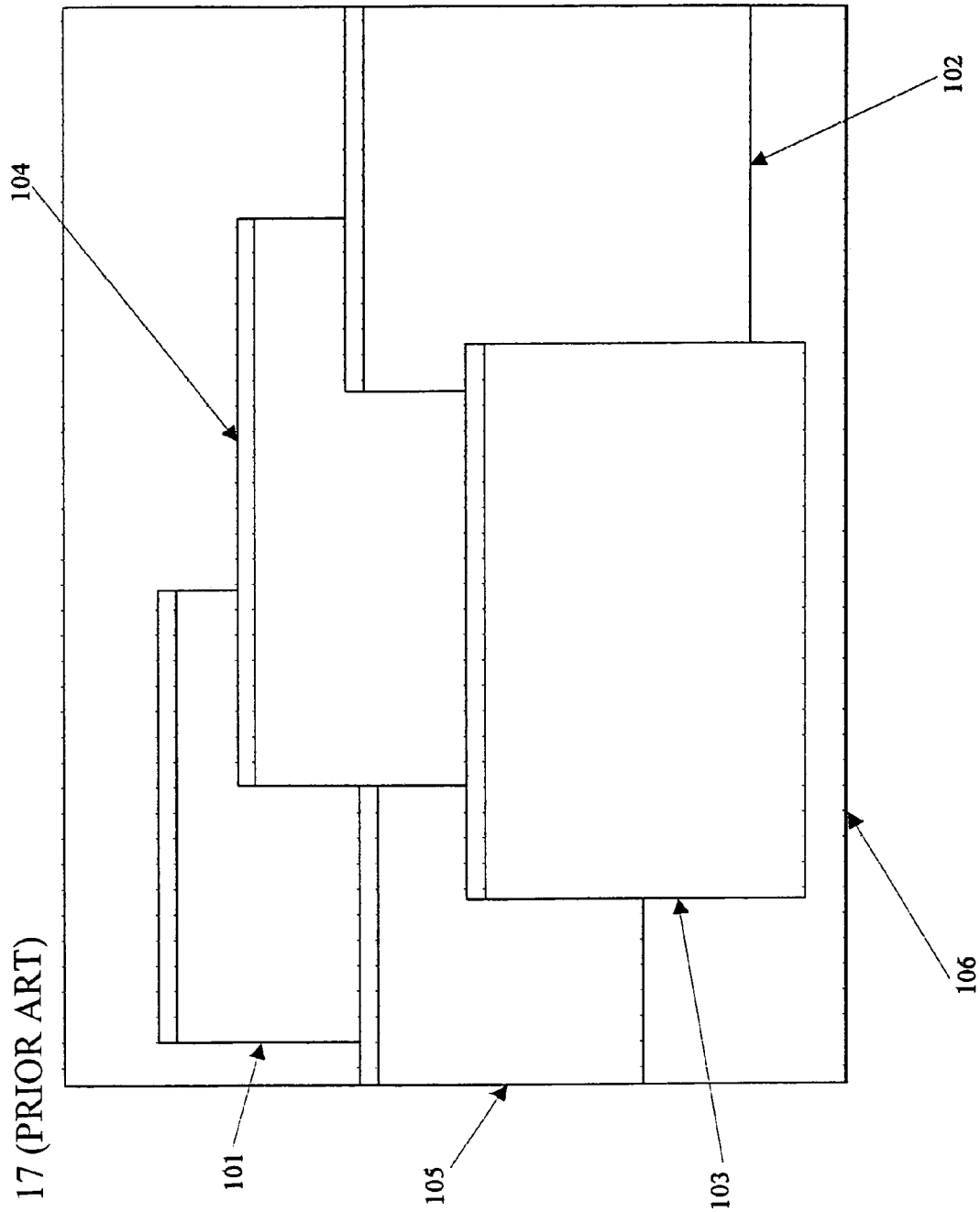
FIG. 17 is a graphic representation of a method in the prior art.
Figure 18:
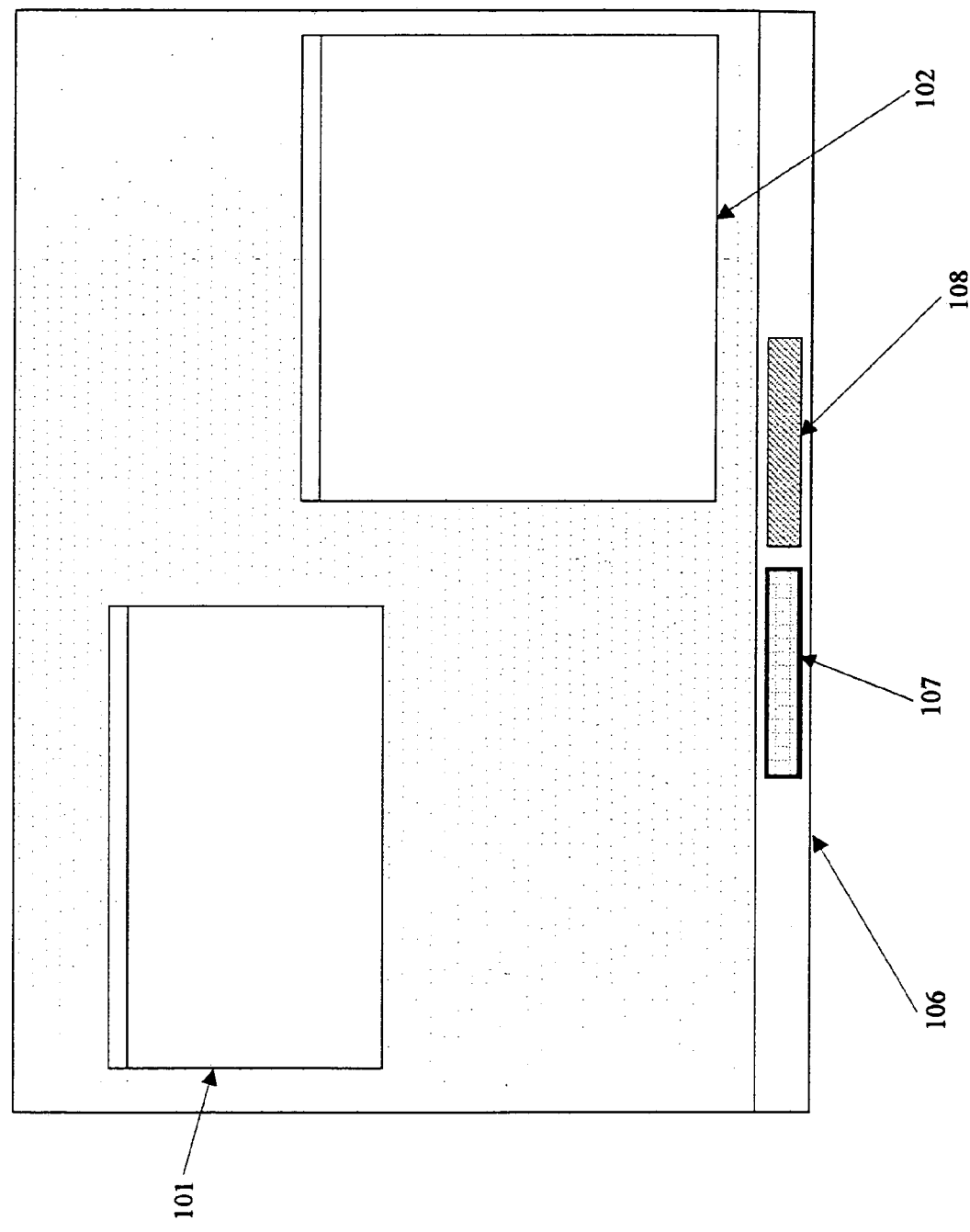
FIGS. 18 and 19 are graphic representations of another method in the prior art.
Figure 19:
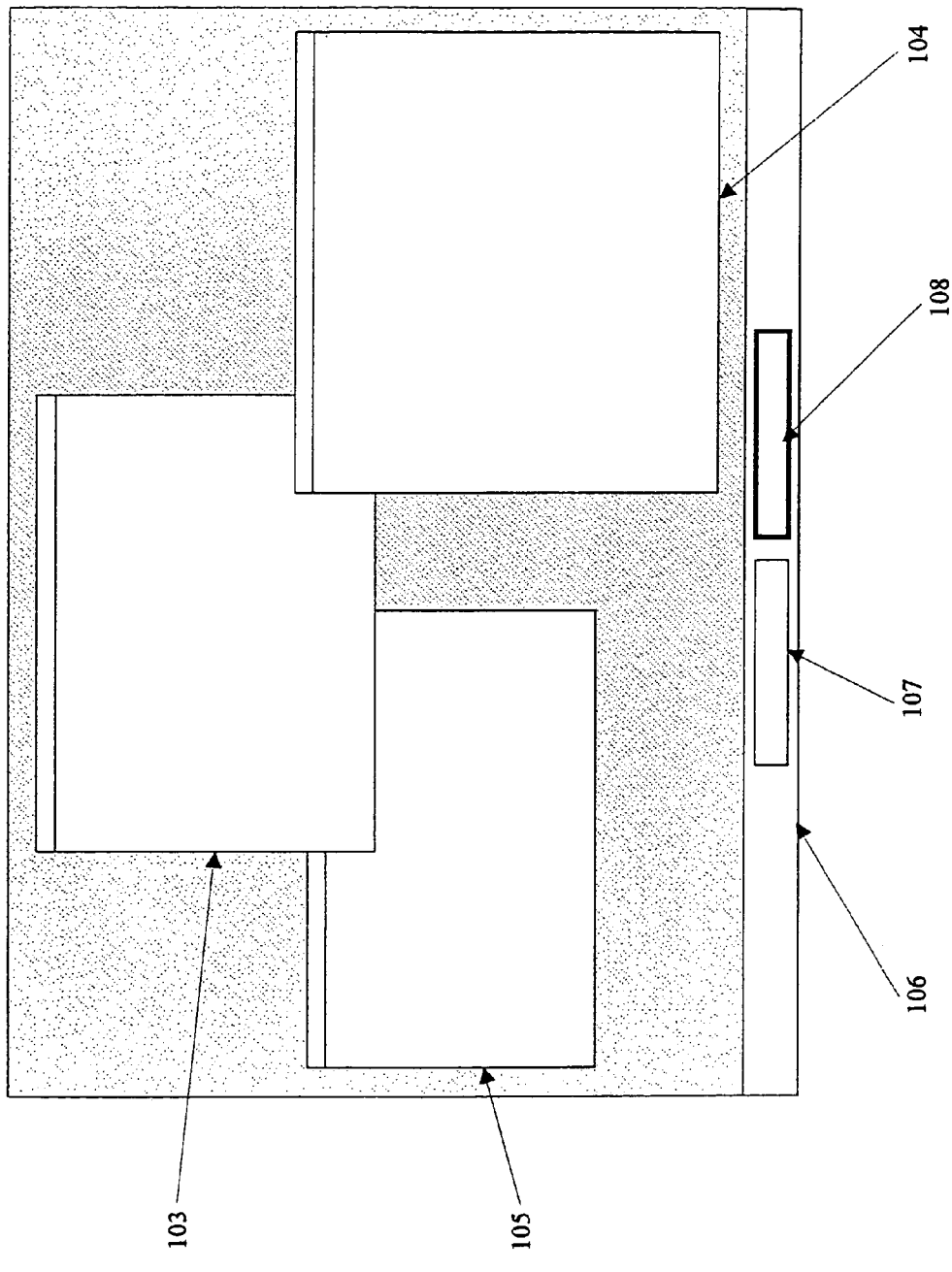

Displaying the representatives is not limited to the above described form of virtual keys. Rather, the representatives may equally be represented by an image of the display space which is modified in shape and/or size, as is shown in FIG. 16 by reference numeral 13. By actuating respective images of the views in the reduced display space with suitable input means, the navigation previously described by reference to FIGS. 1 to 12 is performed.

Even though in the above described embodiment merely one representative is being selected at a respective time, there also is the possibility of several representatives being selected at a same time, and a navigation to all of the selected representatives then being carried out in the above described manner, so that ultimately the region on the work surface is represented in which the views associated with these representatives are located.

Moreover the presence of representatives associated with several views is also possible. In this case, navigation is performed in such a way that ultimately the region is displayed in which the views associated with this representative are located.

Respective representatives, the associations thereof with particular views and/or the contents of the views may be modified, newly created and/or deleted by a user.

One essential advantage of the above described method resides in the fact that a fusion of various desktops with any other desktops and/or intranets and/or internets is possible.

With the above described method, navigation may furthermore be performed as a continuous fade-out/fade-in change from one section to another section.

The representatives may, e.g., be elements of an $n^{th}$-order fractal-hierarchical network including superordinate and subordinate objects.

Objects represented in the sections may moreover be stored. This in turn creates the possibility of the objects represented in the sections being elements of an $n^{th}$-order fractal-hierarchical network.

As is evident from the above description, the representatives may differ in shape, color and/or texture and reflect the contents of the respective sections in the display space assigned to them.

In the above described method, navigating may be triggered both by a user interaction and also automatically. Automatic triggering may herein be derived from calculated quantities.

Preferably, the display space is of infinite size and may moreover have any desired dimension. It is equally preferred for the display space to be closed. A preferred shape in the display space is an ellipsoid or a sphere.

If the above described method is used on a network such as, e.g., a semantic network, then navigation may be triggered, e.g., by an inquiry, such as for example a search inquiry. Such a network may, for example, also be the World-Wide-Web.

Generally speaking, the above described camerawork may be carried out on any desired trajectory from one section to another section. Herein a direction of the camera is freely selectable at any point of the trajectory. A period of dwelling at any point of the trajectory is also freely selectable.

A history of navigating may moreover be used for the purpose of forward and backward navigation.

With regard to further features and advantages of the present invention, express reference is made to the disclosure of the drawing.

The invention claimed is:

1. A computer-implemented method for navigating between sections in a display space, comprising:
assigning a first representative to a first section of said display space, wherein said first section occupies a first location in said display space;
assigning a second representative to a second section of said display space, wherein said second section occupies a second location in said display space, wherein a locational relation exists between said first section and said second section, wherein said first section is displayed in an enlarged view on a work surface, and wherein said second section is not displayed on said work surface;
actuating said second representative to navigate from said first section to said second section;
reducing said enlarged view of said first section in a non-abrupt manner until said second section is displayed on said work surface; and
enlarging said second section in a non-abrupt manner until said first section is no longer displayed on said work surface, wherein said locational relation is maintained between said first section and said second section as said first section is reduced and said second section is enlarged.

2. The method according to claim 1, wherein said reducing and said enlarging are performed as a continuous transition from said first section to said second section.

3. The method according to claim 1, wherein said first representative and said second representative have names.

4. The method according to claim 1, wherein said first representative is associated with an image.

5. The method according to claim 1, wherein objects represented in said first section are stored.

6. The method according to claim 1, wherein said first representative differs from said second representative in shape, color and/or texture and reflect the contents of the first section.

7. The method according to claim 1, wherein said actuating is triggered by a user interaction and/or automatically, with automatic triggering being derivable from calculated quantities.

8. The method according to claim 1, wherein said display space has any desired dimension.

9. The method according to claim 1, wherein said display space is closed.

10. The method according to claim 9, wherein said display space is an ellipsoid or a sphere.

11. The method according to claim 1, wherein said actuating is triggered by an inquiry on a network.

12. The method according to claim 1, wherein said display space includes any desired image.

13. The method according to claim 1, wherein navigating is performed with the aid of camerawork on any desired trajectory from said first section to said second section.

14. The method according to claim 13, wherein a period of dwelling at any point of said trajectory is freely selectable.

15. The method according to claim 14, wherein said dwelling period is calculated from data.

16. The method according to claim 1, wherein said first representative is a virtual operating element.

17. The method according to claim 1, further comprising:
marking said first section; and
moving said second section to said first location in said display space.

18. The method according to claim 17, wherein said enlarged view of said first section is screen-filling.

19. The method according to claim 1, wherein a history of navigating is used to allow backward and forward navigation.

20. The method according to claim 1, wherein said actuating is triggered through an inquiry on the World-Wide-Web.

21. The method according to claim 1, wherein after said enlarging, said second section is screen-filling.

22. The method according to claim 1, wherein said first section does not overlap said second section on said work surface as said first section is reduced and said second section is enlarged.

23. The method according to claim 1, wherein said second section has a size, and wherein said size of said second section increases while said enlarged view of said first section is reduced.

24. The method according to claim 1, wherein said actuating causes said navigation along a trajectory from said first section to said second section, and wherein said navigation dwells at a point along said trajectory.

* * * * *